Nov. 27, 1934.                H. N. SHEPPARD ET AL                1,981,928
ICE CREAM BRANDING MACHINE
Filed May 19, 1933
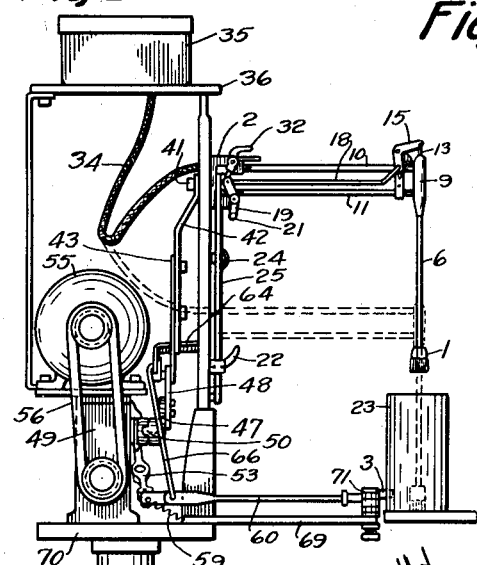
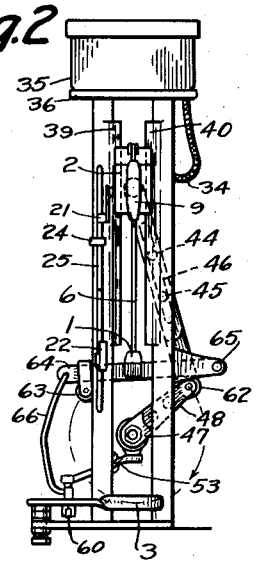
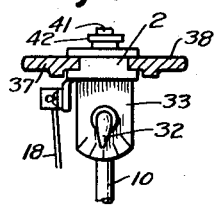
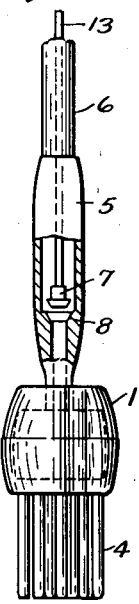
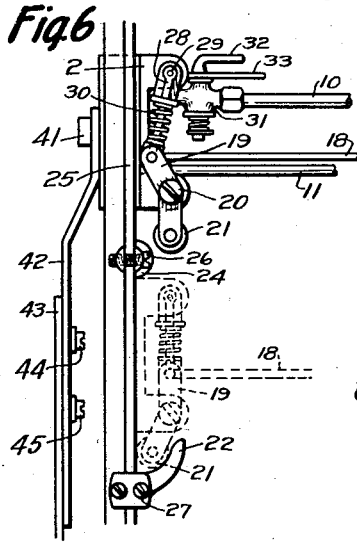
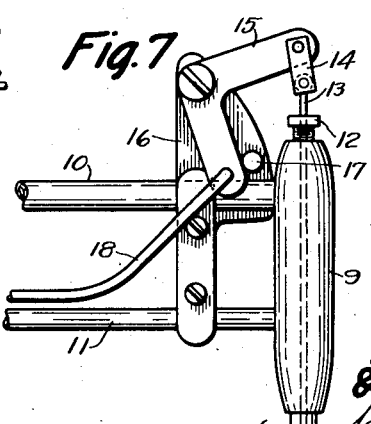
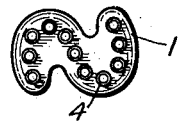
INVENTOR
Harry N. Sheppard
& Samuel I. Powell
James Harrison Bowen
ATTORNEY Patented Nov. 27, 1934

1,981,928

UNITED STATES PATENT OFFICE 1,981,928

ICE CREAM BRANDING MACHINE

Harry N. Sheppard and Samuel I. Powell, Seattle, Wash.

Application May 19, 1933, Serial No. 671,818

6 Claims. (Cl. 107—1)

The invention is a machine for branding ice cream, or similar products, or any product that is placed in a carton in a semi-solid or paste form in which the branding extends continuously thru the substance, or from the bottom to the top, and also in which the branding material may be the same as the product or different therefrom.

Heretofore attempts have been made to mark ice cream in order to make it distinctive but all previous efforts have been confined to molding, by which the ice cream has been molded and different shapes or letters, characters, or marks indicating the maker or brand have been molded on the surface of the ice cream before it is finally frozen and inserted in the package, either as a brick, roll, or in some other design. Ice cream has also been made in the form of "Eskimo Pies", or supplied in containers such as "Dixie" cups, and in many other novelty and fancy shaped containers, and has also been supplied in different colors and the colors run continuously thru the brick, the roll or the like.

This invention, therefore, relates to the branding of ice cream in which a distinctive letter, character, or other mark, which is representative of the maker, or brand, extends continuously thru the brick or roll so that it may be readily observed in any portion or part thereof.

In packing ice cream the semi-frozen product is run thru a machine which fills cartons or packages of some description and after the carton has been filled a plunger is inserted therein which passed downward to the bottom of the carton and is then raised, and as it passes upward, it ejects material, preferably of a slightly different color, or it may be of the same color so that the space thru which it passed is continuously filled with the branding material. The carton is then conveyed to means for finishing the freezing of the ice cream.

The purpose of the invention is to enable a manufacturer to mark his product continuously therethru in such a manner that as each portion is sliced, the mark is discernible in each portion so that the ultimate consumer may readily identify the product.

The object of the invention is, therefore, to provide means for inserting a branding material in a particular design or shape continuously thru ice cream, or a similar product in a carton or container.

Another object of the invention is to provide means for introducing a branding material continuously thru ice cream in the semi-frozen state while in a carton which may be used in combination with carton filling machines now in use.

Another object is to provide means for introducing a branding material in ice cream while contained, in a semi-frozen state, in cartons which operate automatically.

Another object is to provide a device that may automatically move a plunger downward thru a carton of ice cream which will automatically stop the plunger and move it upward as the plunger arrives at the bottom of the carton.

Another object is to provide means for moving a plunger downward and upward thru a carton of ice cream in which the plunger will eject material as it moves upward.

Another object is to provide a device for moving a plunger downward and upward in a container and feeding material therefrom in which the amount of material may readily be regulated.

Another object is to provide a device for moving a plunger downward and upward thru ice cream in a carton in which the travel of the plunger may readily be adjusted.

Another object is to provide a device for moving a plunger downward and upward thru a carton of ice cream in which the operation thereof may be automatically started by the carton as it reaches a pre-determined position.

A further object is to provide means for feeding a material to the nozzle of a plunger that may be passed downward and upward thru a container of ice cream in which the material fed thru the nozzle is distributed to all points thereof.

And a still further object of the invention is to provide means for inserting ice cream of one color into and continuously thru in a special design, ice cream in a semi-frozen state, in a carton or the like, which is of a simple and economical construction.

With these ends in view the invention embodies a plunger, means automatically lowering and raising said plunger, means feeding a material thru said plunger as it is raised, means automatically stopping the downward movement of said plunger and starting it upward, and means automatically starting the downward movement of said plunger as an object reaches a position directly below the plunger which is operated by the object.

Other features and advantages of the invention will appear from the following description taken in connection with the drawing, wherein:

Figure 1 is a side elevation showing the machine as it may be used in combination with an ice cream packaging machine.

Figure 2 is a front elevation with parts omitted showing the upper part of the machine.

Figure 3 is a sectional plan showing the sliding head and the valve for adjusting the flow of the branding material.

Figure 4 is a view showing the plunger with parts broken away.

Figure 5 is a view showing the trip for starting the machine in combination with the clutch which is operated by the trip.

Figure 6 is a detail showing the tripping mechanism at the side of the head in the upper position and dotted in the lower position.

Figure 7 is a detail showing the valve operating mechanism at the upper end of the plunger.

Figure 8 is a detail showing the end of the plunger.

In the drawing the device is shown as it would be made wherein numeral 1 indicates the plunger, numeral 2 the sliding head, and numeral 3 the starting trip lever.

The head 1 may be made as shown with a comparatively hollow casing having a plurality of comparatively small tubes extending downward from the end thereof. The plunger may be designed in any shape desired and may be made to represent the letter S, as shown in Figure 8, or any letter, character, emblem, or any combination of letters, characters, or designs, as may be desired. In the design shown the plunger is made in the form of the letter S and a plurality of small tubes 4 extend downward from the lower end thereof so that as the material is fed out of the plunger it will be fed uniformly at a number of points and thereby equally distributed over the surface of the letter. These tubes may also be arranged in the shape of the letter S or in any shape or design to facilitate distributing the branding material. The outer surfaces of the plunger 1 may be curved, as shown in Figure 4, so that it may readily move upward and downward thru the semi-frozen ice cream, or paste. At the upper end of the plunger is a member 5 which connects the plunger to a stem 6, and in this member is a valve 7 which regulates the flow of the branding fluid thru the plunger. The valve is raised above the seat 8 and it will be noted that the valve is operated by the trip mechanism on the head 2 so that it may be in the closed position as the plunger descends through the ice cream and opened as the plunger starts upward after reaching the lower end of the carton in which the product may be contained. At the upper end of the stem 6 is a member 9 which is supported at the outer end of the supply tube 10 and a rod 11 which extends outward from the head 2, and in the upper end of the member 9 is a packing gland 12 through which a rod 13, on the lower end of which is the valve 7, passes, as shown in Figure 7. The upper end of the rod 13 is connected by a link 14 to a bell-crank 15 and the bell-crank is pivotally mounted on a bracket 16 at the outer end of the members 10 and 11. The member 16 may be provided with a stop 17 to limit the movement of the bell-crank to control the opening movement of the valve. The bell-crank is connected by a rod 18 to a lever 19 in the trip mechanism and the lever 19 is pivotally mounted on a pin 20 at the lower end, and at one side of the head 2. This lever may remain in the position shown in full lines in Figure 6, and as the head is lowered, a roller 21 at the lower end of the lever 19 will engage a trip 22 and move the roller inward so that it will move the upper end of the lever 19 outward, thereby moving the rod 18 toward the member 9 and raising the bell-crank 15 to the position shown by full lines in Figure 7. The trip 22 is positioned so that it will operate the lever 19 and thereby open the valve 7 as the plunger reaches the lower end of its downward movement which will correspond with the bottom of a carton 23 into which the plunger may pass. After the valve 7 is opened the plunger moves upward and as it arrives at the upper end of the container 23, the roller 21 will engage an adjustable stop 24 which will move the roller outward to the position shown in full lines in Figure 6 and this will draw the rod 18 backward and operate the bell-crank so that it will push the rod 13 downward and close the valve, thereby preventing more of the branding fluid passing out of the plunger. It will be noted that the stop 24 is clamped on a rail 25 by a screw 26 and it may therefore be adjusted to any position on the rail so that it will automatically close the valve the instant the lower ends of the tubes 4 reach the upper end of the material in the container 23. The trip 22 is also clamped on the rail 25 by screws 27 so that it also may be adjusted to automatically open the valve the instant the lower ends of the tubes 4 reach the bottom of the container and start upward. The upper end of the lever 19 is pivotally connected to a rod 28 and the upper end of the rod 28 is mounted on a pin 29 in the upper end of the head 2, and the rod is provided with a spring 30 which resiliently holds the lever 19 in the position shown in full lines in Figure 6 until the pivot point at the upper end has been moved beyond the center by the trip 22. The spring, therefore, operates to close the valve 7 and hold the valve closed while the plunger is traveling the remainder of the upward movement and also during the downward movement. It will be understood that any other means may be used for adjusting and regulating the valve trip mechanism and also for opening and closing the valve as the mechanism is operated.

At the inner end of the tube 10 is a control valve 31 having a lever 32 extending upward thru a graduated plate 33 as shown in Figures 3 and 6 and it will be noted that the lever 32 may be set to permit any amount of the branding material to flow thru the tube 10 that may be desired. The inner end of the tube 10 is connected by a hose 34 or any flexible tube to a container 35 located on a shelf 36 at the upper end of the stand. It will also be understood that the branding material may be supplied by any other means or in any other manner and the container 35 may also be of any other shape or design and located at any other point.

The head 2 may be made of any shape or design and may be slidably held between side sections 37 and 38 as shown in Figure 3. The inner edges of the sections 37 and 38 may be provided with tracks 39 and 40, as shown in Figure 2, and these tracks may be of any design and may be formed or held to the members 37 and 38 by any means. Any means may, therefore, be provided for forming a slide in which the head 2 may move upward and downward. At the rear of the head is a bolt 41 to which an arm 42 is pivotally connected and the arm 42 is held to a bar 43 by bolts 44 and 45 which extend thru a slot 46 so that these two parts may be adjusted in relation to each other to extend or contract the length of the connection between the eccentric crank 47 and the head. Another bar 48 may also be located between the crank and the bar 43 and this may be adjustably held so that the distance of travel of the head may be adjusted. It will be understood that any other means may be used for connecting the head to the eccentric crank so that the head may be moved upward and downward, thereby, and so that the travel of the head may be adjusted. The eccentric crank 47 is rotatably mounted at the side of a casing 49 and the inner end is provided with jaws 50 which engage similar jaws 51 in a sliding collar 52 which may be operated by an arm 53 having a yoke 54 in the outer end thereof. The casing 49 may be of any type or design and any means may be used for rotating the crank 47. In the design shown a motor 55 is positioned on top of the casing and this drives the operating mechanism in the casing 49 thru a belt 56. The operating mechanism in the casing 49 may be arranged in any manner and, as heretofore stated, any means may be used for rotating the shaft upon which the arm 47 is mounted. The arm 53 is pivotally mounted in a bracket 57 on the side of the casing 49 and the outer end of the arm 53 is pivotally connected to a lever 58 and resiliently held outward by a spring 59. The lever 58 is pivotally attached to a rod 60 and the opposite end of the rod 60 extends outward and is connected thru a socket 61 to the trip operating lever 3. It will be noted that with the members 58 and 60 in the straight position, as shown in Figure 1, a container 23 may engage the lever 3 and move the lever toward the stand so that it will move the inner end of the arm 53 inward and the opposite end thereof outward so that the yoke 54 will move the clutch collar 52 so that the jaws of the clutch will engage and the crank 47 will be rotated thereby.

As the crank 47 makes a complete revolution, a roller 62 in the outer end thereof will strike a roller 63 on an arm 64, which is pivotally mounted at the opposite side of the stand on a pin 65, and raise the end of the lever 64 so that it will draw a rod 66 upward and as the lower end of the rod 66 is connected to a pivot point of the members 58 and 60, this connection will be broken, as shown in Figure 5, and the spring 59 will draw the clutch members out of engagement thru the arm 53 so that the movement of the head and plunger will stop. Projection 67 may be provided at the outer end of the lever 58 to limit the downward movement thereof as it will be noted that this projection will rest upon the upper edge of the bar 60 and hold these members in a straight line as shown in Figure 1.

The lever 3 is pivotally mounted on a pin 68 at the outer end of an arm 69 which extends outward from the base 70 of the stand and the height of the lever may be readily adjusted by using a greater or smaller number of washers 71 on the pin 68. The lower end of the pin may be provided with a nut 72 and a spring 73 to resiliently hold the lever. The base 70 of the stand may be mounted upon a pedestal 74 or may be mounted on a stand of any type or description and arranged in any manner.

It will be understood that other changes may be made in the construction without departing from the spirit of the invention. One of which changes may be in the use of a plunger of any other type or design, another may be in the use of other means for raising and lowering the plunger, another may be in the use of other means for adjusting the length of the stroke, another may be in the use of other means for automatically starting the device as the plunger reaches a pre-determined position, and still another may be in the use of other means for automatically stopping the movement of the device after the plunger has travelled thru the material in the container.

The construction will be readily understood from the foregoing description. In use the machine may be provided as shown and described and it will be noted that it may be installed in connection with any machine for packing or filling cartons with ice cream or any similar product in a semi-frozen state, or any product in a paste or plastic form such as lard, butter, or the like, or any product which may be in a paste form at any stage during the manufacture thereof, and it may be positioned so that any carton or parcel containing portions of the product may pass this device in such a manner that the carton or parcel will engage the lever 3 to move it inward to operate the clutch mechanism as hereinbefore described. The said carton or parcel should be moved with an intermittent motion so that it will come to rest directly below the plunger and remain in this position until the plunger moves downward and upward by the mechanism of this device as hereinbefore described. During this movement the plunger will automatically deposit a substance that may be contained in the container 35 thruout the product in the carton or parcel and as this substance may be of a slightly different consistency or of a different color, it will mark the product so that any part thereof, or any part cut therefrom will contain the mark and thereby indicate any particular brand. The design of the plunger 3 may be made to indicate a particular trade-mark or brand of a manufacturer and the products so branded will be known as belonging to a certain manufacturer.

Having thus fully described the invention what we claim as new and desire to secure by Letters Patent, is:

1. In an ice cream branding machine a plunger having a plurality of tubes extending downward therefrom, said tubes arranged in such a position that they represent a letter or design, a supply tube extending upward from said plunger, a valve in said supply tube, a vertical stand, a head upon which said plunger is mounted slidable on said stand, an eccentric adapted to move said head and plunger upward and downward, a trip on said stand adapted to open the valve in the tube above said plunger as the plunger reaches the limit of its downward movement, another trip adapted to close said valve as the plunger moves upward, a container at the upper end of said stand, a flexible connection from said container to the tube above the plunger, a starting lever positioned to be engaged by a container as it arrives at a position directly below said plunger, a clutch adapted to be moved into engagement by said starting lever to start the downward movement of said head and plunger, a trip lever adapted to break the connection between the starting lever and clutch as the movement of the head and plunger is complete, resilient means adapted to free said clutch, and means rotating said eccentric when the clutch is in engagement.

2. In a branding machine as described in claim 1, means adjusting the flow of material from the container to the plunger.

3. In a branding machine as described in claim 1 means adjusting the travel of said head and plunger.

4. The herein described process of branding ice cream or similar products which consists in inserting a feeder in a carton containing the product in a semi-frozen state with the feeder in the closed position, opening the feeder as it arrives at the bottom of the carton and feeding branding material therethru as it is raised thru the product.

5. In a branding machine, a plunger having feeding tubes extending therefrom, a supply tube extending upward from said plunger, an automatically operated valve in said supply tube, a stand upon which said plunger is slidably mounted, means adapted to move said plunger with a reciprocating motion, means adapted to open the valve in the supply tube as the plunger reaches the extreme of its movement in one direction, other means adapted to close said valve as the plunger moves in the opposite direction, a starting lever positioned to be engaged by a container as it arrives at a position in alignment with said plunger, said starting lever adapted to start the operation of said plunger, and a release adapted to stop the operation of said plunger as it arrives at one end of its movement.

6. A machine as described in claim 5 in which the plunger is supported from a sliding carriage mounted in rails on said stand and the supply valve opening and closing means is operated by stops positioned to be engaged by said carriage.

HARRY N. SHEPPARD.
SAMUEL I. POWELL.